United States Patent [19]

Tolles

[11] 3,951,512

[45] Apr. 20, 1976

[54] MICROSCOPE SLIDE REFERENCE APPARATUS

[76] Inventor: Walter E. Tolles, Cove Neck Road, Oyster Bay, N.Y. 11771

[22] Filed: Nov. 4, 1974

[21] Appl. No.: 520,764

[52] U.S. Cl. .................................. 350/90; 350/92; 350/94
[51] Int. Cl.² ........................................ G02B 21/24
[58] Field of Search ........................... 350/90, 94, 92

[56] References Cited
UNITED STATES PATENTS

| | | | |
|---|---|---|---|
| 1,891,052 | 12/1932 | Ott | 350/90 |
| 2,656,760 | 10/1953 | Bowerman | 350/90 |
| 3,436,140 | 4/1969 | Lord | 350/94 |
| 3,765,745 | 10/1973 | Burboeck | 350/90 |

OTHER PUBLICATIONS

"Holder to Facilitate Visual Inspection of Ceramic Circuits" by K. S. Kniat, Western Electric Tech. DIG. No. 25, Jan. 1972 pp. 51, 52.

*Primary Examiner*—Harold A. Dixon
*Attorney, Agent, or Firm*—Bauer, Amer & King

[57] ABSTRACT

A holder for a microscope slide and an indexing slide, such as a London Finder, aligns the two elements and mounts in the conventional microscope stage clamp.

4 Claims, 11 Drawing Figures

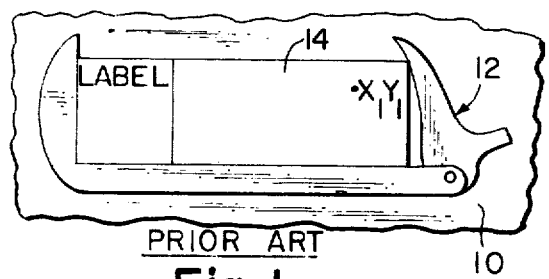
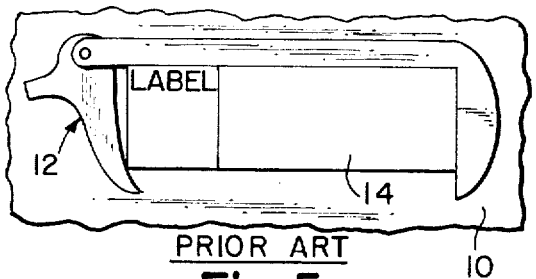
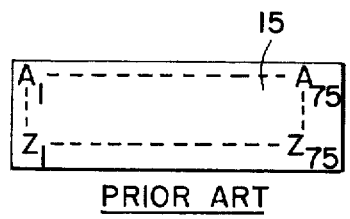
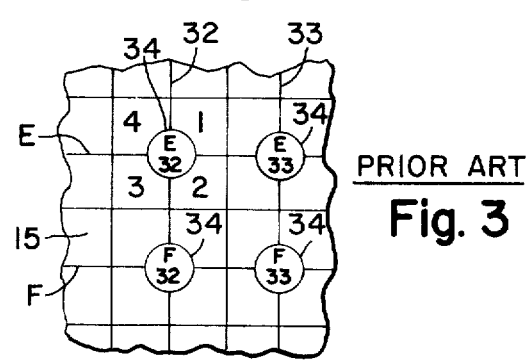
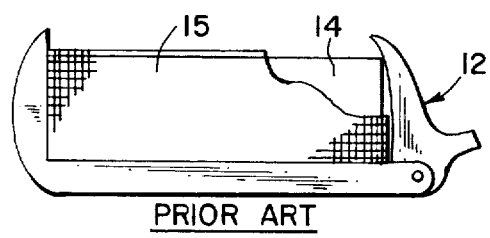
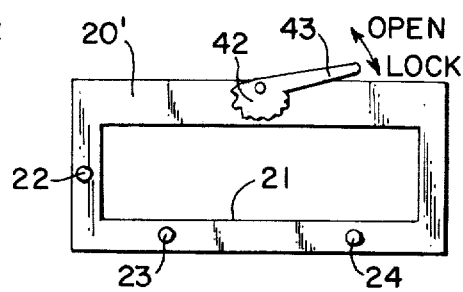
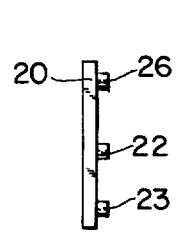
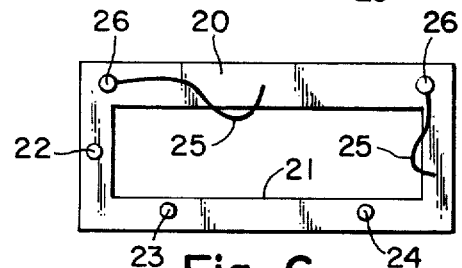
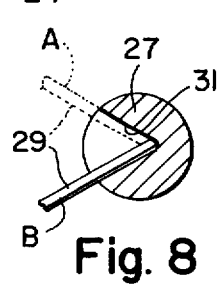
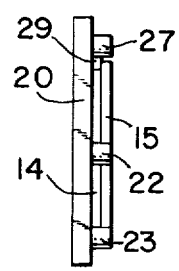
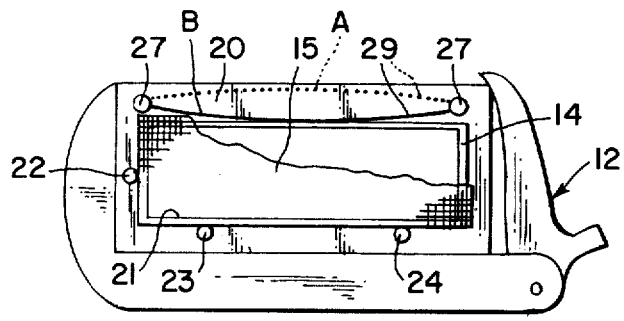

MICROSCOPE SLIDE REFERENCE APPARATUS

The aforementioned Abstract is neither intended to define the invention of the application which, of course, is measured by the Claims, nor is it intended to be limiting as to the scope of the invention in any way.

BACKGROUND OF THE INVENTION

Field of the Invention

This invention relates to microscopes and in particular to holders for slides to be viewed with the microscope.

A researcher deciding to identify the location of an event of interest on a microscope slide, such as a cell, employs a method of indexing. One such well known method employs a "London Finder." The London Finder is a glass slide carrying a photo deposited matrix of one mm. elements lettered from A-Z along the Y axis and numbered from 1 to 75 along the X axis. The resulting rectangles are further divided into four quadrants and a centered label area. The left and right sides are ground perpendicular to the bottom side for positioning of the finder in a particular mechanical stage. To locate the coordinates of a particular object the London Finder is superimposed over the slide and maintained firmly in contact with the left and bottom surfaces of the stage. The event of interest is then located and the position identified by the label at the center of the finder rectangle.

The system works well when used with the same microscope and stage. However, assume that the slide is now sent to a distant worker and he in turn desires to locate the identified cell. If his microscope employs a stage of different manufacture which is indexed right and bottom, whereas the coordinates given are with reference to left and bottom, this will create an error of an indeterminate amount. Still other researchers may have microscope stages arranged to index left and top or right and top. To overcome the difficulty, the present invention provides a holder which may be used in conjunction with the London Finder to provide positive accurate indexing, irrespective of the particular microscope stage employed.

SUMMARY OF THE INVENTION

A holder is provided which will hold a microscope slide and a London Finder, in a fixed relationship. The holder can be used on any conventional microscope stage having a clamping means.

BRIEF DESCRIPTION OF THE DRAWINGS

In the various figures of the drawing like reference characters designate like parts.

In the drawing:

FIG. 1 is a plan view of a portion of a conventional microscope stage and a slide secured in a clamp carried thereon;

FIG. 2 is a plan view of a prior art London Finder with a representative number of grid lines shown;

FIG. 3 is an enlarged plan view of a portion of the London Finder shown in FIG. 2;

FIG. 4 is a plan view of the clamp of FIG. 1 with the slide and London Grid of FIG. 2;

FIG. 5 is a plan view of another prior art microscope stage slide clamp;

FIG. 6 is a plan view of the slide holder of this invention;

FIG. 7 is a side elevational view of the slide holder shown in FIG. 6;

FIG. 8 is a detail of a portion of a spring and supporting post with a portion of the post sectioned to expose the spring;

FIG. 9 is a plan view of the slide holder of FIG. 7 with a slide and a London Grid;

FIG. 10 is a side elevational view of the slide holder shown in FIG. 9; and

FIG. 11 is a plan view of a holder of this invention employing an alternative clamping means.

DESCRIPTION OF THE PREFERRED EMBODIMENT

A microscope is conventionally provided with a moveable support for a slide to be viewed. The slide is clamped onto the support known as a "mechanical stage". Lead screws permit lateral and longitudinal movement of the stage to locate the portion of the slide of interest in front of the objective lens. The fore-going being well known to those working with microscopes, the drawings do not show the microscope or stage in detail. In FIG. 1 there is shown a portion of a typical stage 10 and mounted thereon a clamping means 12 and a slide 14 secured therein.

In FIG. 2 there is shown a London Finder which consists of a glass slide having deposited thereon a series of intersecting grid lines, a representative few being shown for purposes of illustration. The lines are labelled A to Z along the Y-Axis and from 1 to 75 along the X-Axis.

There is shown a greatly enlarged portion of the London Finder 15 in FIG. 3. Where lines 32 and 33 intersect lines E and F, an appropriate identifying legend 34 is provided which is clearly visible under the microscope. Surrounding the legend 34 there are four rectangles which by convention comprise quadrants 1, 2, 3, and 4 reading clockwise from the upper right hand corner.

The Finder is deliberately made larger than the conventional 25×75 mm slide so it can never have coincident indexing on all sides. Finally, the slides themselves vary slightly in size, as much as 0.5 mm or 500 microns. It is these facts which prohibit the easy and accurate use of the London Finder in any clamp system except the original one.

When a researcher finds an event of interest on slide 14 he superimposes the London Finder 15 to locate the coordinates and quadrant, for example, E-32, quadrant 1 and can now transmit this data to an associate so that he may observe the selected area of the slide. However if the associate has a slide clamp oriented as in FIG. 5 an error of location in both X and Y coordinates will occur which would make it unlikely that he could locate the specific cell or other event of interest. Reference will now be made to FIG. 6. To overcome the problem of relying on the microscope stage itself, or the indexing means, the present invention provides a holder 20 approximately 80 mm long by 35 mm wide by 3 mm thick, with a cut-out portion approximately 70 mm × 20 mm. Extending therefrom are locating pins 22, 23 and 24.

The slide holder of this invention relies on three posts 22, 23 and 24 as the total indexing means, thus there is no need for more than nominal machining accuracy in producing the holder. This is important economically and technically.

The coordinates of an event of interest with a London Finder in the slide holder of this invention can be determined within 10 microns (0.0005 inch) when the slide is sent to another worker with a different microscope, stage clamp orientation and who uses another slide holder of this invention.

A suitable material for this purpose is brass although other metals such as steel and aluminum may be employed. The assembly may instead be molded in one piece of a dimensionally stable synthetic resin such as glass filled epoxy, nylon or polycarbonate. The slide 14 and the grid 15 are then positioned against posts 22, 23 and 24 for positive alignment. Spring members 25 rigidly secured in posts 26 maintain the slide in position. The London Grid sits on the slide but above the spring. The London Grid is slightly larger than the standard 75×25 mm slide.

Other spring arrangements may be employed. For example, as shown in FIGS. 8 and 9, spring 29 moves between open positions A and locking position B. This is accomplished by capturing a flat spring between two pivot points. The spring 29 is longer than the distance between pivot points 31 of posts 27. The use of springs for maintaining the slide and the London Grid in contact with pins 22, 23 and 24 is but one suitable embodiment. However, other arrangements may be utilized. Such an alternative arrangement is shown, for example, in FIG. 11 wherein an offcenter cam 42 is actuated by lever 43 to lock the slide in position. The London Grid is secured in position by the posts 22, 23 and 24.

It will be appreciated that no longer is the worker dependent on the orientation of the clamp per se or the reference lands but merely on the London Grid and holder. Since the orientation of the posts relative to each other is the same in all units within easily maintained manufacturing tolerances the desired result is readily achieved.

The London Grid has been used by way of example, however, it is to be understood that other grid and grid coding systems may be employed in combination with the apparatus of this invention.

There has been disclosed heretofore the best embodiments of the invention presently contemplated. However, it is to be understood that various changes and modifications may be made thereto without departing from the spirit of the invention.

What I claim as new and desire to secure by Letters Patent are:

1. A portable holder for a microscope slide and a grid used together therewith comprising:
    a. a rectangular plate having a pair of parallel faces and four intersecting edges defining a central rectangular opening, smaller than the slide to be held, extending through said faces;
    b. three aligning pins extending perpendicularly from one of said faces, said pins having a height dimension sufficient to receive both a slide and a cooperating grid in abutment therewith two of said pins being in a line substantially parallel to one said edge of the central opening and the other said pin adjacent to another said edge intersecting the first named said edge; and
    c. means for releasably clamping the slide against said aligning pins.

2. The holder of claim 1 wherein said means for releasably clamping the slide is a cam.

3. The holder of claim 1 wherein said means for releasably clamping the slide is a spring.

4. The apparatus of claim 3 wherein the said means for clamping is a bowed leaf spring held captive at its ends.

* * * * *